US009577776B2

(12) United States Patent
Kishiyama et al.

(10) Patent No.: US 9,577,776 B2
(45) Date of Patent: Feb. 21, 2017

(54) COMMUNICATION SYSTEM, LOCAL AREA BASE STATION APPARATUS, MOBILE TERMINAL APPARATUS AND COMMUNICATION METHOD

(71) Applicant: NTT DOCOMO, INC., Tokyo (JP)

(72) Inventors: Yoshihisa Kishiyama, Tokyo (JP); Anass Benjebbour, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/390,067

(22) PCT Filed: Apr. 5, 2013

(86) PCT No.: PCT/JP2013/060479
§ 371 (c)(1),
(2) Date: Oct. 2, 2014

(87) PCT Pub. No.: WO2013/151158
PCT Pub. Date: Oct. 10, 2013

(65) Prior Publication Data
US 2015/0078325 A1    Mar. 19, 2015

(30) Foreign Application Priority Data

Apr. 6, 2012 (JP) ................................ 2012-087673

(51) Int. Cl.
*H04W 4/00* (2009.01)
*H04J 11/00* (2006.01)
(Continued)

(52) U.S. Cl.
CPC ............ *H04J 11/0056* (2013.01); *H04L 5/001* (2013.01); *H04L 5/0035* (2013.01); *H04L 5/143* (2013.01);
(Continued)

(58) Field of Classification Search
CPC .. H04J 11/0056; H04W 76/026; H04W 88/02; H04W 88/08; H04W 72/0446; H04L 5/001; H04L 5/0007; H04L 5/0032; H04L 5/0037; H04L 5/143; H04L 5/1469; H04L 5/0035
See application file for complete search history.

(56) References Cited

U.S. PATENT DOCUMENTS

2008/0279123 A1* 11/2008 Struhsaker ............. H01Q 1/246
370/280
2009/0291690 A1* 11/2009 Guvenc ................. H04W 16/10
455/444
(Continued)

FOREIGN PATENT DOCUMENTS

EP    1565017 A2    8/2005
GB    2412541 A     9/2005
(Continued)

OTHER PUBLICATIONS

International Search Report issued in PCT/JP2013/060479 mailed on Jun. 4, 2013 (2 pages).
(Continued)

*Primary Examiner* — Kevin Mew
(74) *Attorney, Agent, or Firm* — Osha Liang LLP

(57) ABSTRACT

The present invention is designed to provide a communication system, a local area base station apparatus, a mobile terminal apparatus and a communication method that can provide highly efficient local area radio access. In a communication system in which a mobile terminal apparatus performs radio communication with a wide area base station apparatus that covers a wide area, using a first carrier frequency, and performs radio communication with a local area base station apparatus that covers a local area, using a second carrier frequency, the wide area base station apparatus allocates different frequencies between the uplink and
(Continued)

the downlink in the first carrier frequency and communicates with the mobile terminal apparatus, and the local area base station apparatus dynamically switches between the uplink and the downlink in the second carrier frequency on a per time basis based on the communication environment, and communicates with the mobile terminal apparatus.

14 Claims, 11 Drawing Sheets

(51) Int. Cl.
| | | |
|---|---|---|
| *H04W 76/02* | (2009.01) | |
| *H04W 72/04* | (2009.01) | |
| *H04L 5/14* | (2006.01) | |
| *H04W 16/32* | (2009.01) | |
| *H04L 5/00* | (2006.01) | |
| *H04W 88/02* | (2009.01) | |
| *H04W 88/08* | (2009.01) | |

(52) U.S. Cl.
CPC ........ *H04L 5/1469* (2013.01); *H04W 72/0446* (2013.01); *H04W 76/026* (2013.01); *H04L 5/0007* (2013.01); *H04L 5/0032* (2013.01); *H04L 5/0037* (2013.01); *H04W 16/32* (2013.01); *H04W 88/02* (2013.01); *H04W 88/08* (2013.01)

(56) References Cited

U.S. PATENT DOCUMENTS

| | | | | |
|---|---|---|---|---|
| 2011/0019634 A1* | 1/2011 | Fujii | ............... | H04W 16/14 370/329 |
| 2011/0044312 A1* | 2/2011 | Lee | ............... | H04L 5/0007 370/344 |
| 2011/0090854 A1* | 4/2011 | Montojo | ............... | H04L 5/0007 370/329 |
| 2011/0149813 A1* | 6/2011 | Parkvall | ............... | H04B 7/2656 370/280 |
| 2011/0190011 A1* | 8/2011 | Choi | ............... | H04L 5/0007 455/466 |
| 2011/0200019 A1* | 8/2011 | Manbo | ............... | H04W 72/048 370/336 |
| 2011/0268001 A1* | 11/2011 | Lee | ............... | H04L 5/0005 370/311 |
| 2011/0310856 A1* | 12/2011 | Hariharan | ............... | H04L 1/1607 370/336 |
| 2012/0071190 A1* | 3/2012 | Choi | ............... | H04L 5/0037 455/517 |
| 2012/0087396 A1* | 4/2012 | Nimbalker | ............... | H04L 1/1822 375/219 |
| 2012/0213123 A1 | 8/2012 | Futaki | | |
| 2012/0281602 A1 | 11/2012 | Tsunekawa | | |
| 2012/0307744 A1* | 12/2012 | Charbit | ............... | H04W 72/1205 370/329 |
| 2013/0003664 A1* | 1/2013 | Frenne | ............... | H04W 72/1289 370/329 |
| 2013/0039231 A1* | 2/2013 | Wang | ............... | H04W 72/10 370/329 |
| 2013/0114472 A1* | 5/2013 | Tamaki | ............... | H04L 1/1854 370/280 |
| 2013/0121301 A1 | 5/2013 | Kim et al. | | |
| 2013/0194981 A1* | 8/2013 | Wang | ............... | H04L 1/1671 370/280 |
| 2014/0003381 A1* | 1/2014 | Lee | ............... | H04L 1/0026 370/329 |
| 2014/0078941 A1* | 3/2014 | Seo | ............... | H04L 1/1822 370/280 |
| 2014/0105165 A1* | 4/2014 | Dinan | ............... | H04L 27/2692 370/329 |
| 2014/0119313 A1* | 5/2014 | Yang | ............... | H04L 5/001 370/329 |

FOREIGN PATENT DOCUMENTS

| | | |
|---|---|---|
| JP | 2004-120237 A | 4/2004 |
| JP | 2011-512097 A | 4/2011 |
| WO | 2009/100371 A2 | 8/2009 |
| WO | 2011/052643 A1 | 5/2011 |
| WO | 2011/087022 A1 | 7/2011 |
| WO | 2012/015154 A1 | 2/2012 |
| WO | 2012/044846 A1 | 4/2012 |

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)"; Dec. 2009 (18 pages).
Notification of Reasons for Rejection issued in the counterpart Japanese Patent Application No. 2012-087673, mailed Feb. 9, 2016 (6 pages).
Extended European Search Report issued in the counterpart European Patent Application No. 137728622, mailed Nov. 16, 2015 (8 pages).
Office Action issued in corresponding Japanese Application No. 2012-087673, mailed Jun. 14, 2016 (7 pages).

* cited by examiner

|  | WIDE AREA | LOCAL AREA |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.4 ical Field

The present invention relates to a communication system, a local area base station apparatus, a mobile terminal apparatus, and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Furthermore, successor systems of LTE are also under study for the purpose of achieving further broadbandization and higher speed beyond LTE (referred to as, for example, "LTE-advanced" or "LTE enhancement" (hereinafter referred to as "LTE-A")). In LTE-A (Rel-10), carrier aggregation to make a broad band by grouping a plurality of component carriers (CCs), where the system band of the LTE system is one unit, is used. Also, in LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of near-field communication supporting local areas such as indoors, shopping malls and so on, in addition to cellular environment such as given above, will be provided. Consequently, there is a demand to design new radio communication schemes that are specifically designed for local areas, so that capacity can be secured with local areas while coverage is secured with a wide area.

The present invention has been made in view of the above, and it is therefore an object of the present invention to provide a communication system, a local area base station apparatus, a mobile terminal apparatus, and a communication method that can provide highly efficient local area radio access.

Solution to Problem

The communication system of the present invention is a communication system in which a mobile terminal apparatus performs radio communication with a wide area base station apparatus that covers a wide area, using a first carrier frequency, and performs radio communication with a local area base station apparatus that covers a local area, using a second carrier frequency, and, in this communication system, the wide area base station apparatus allocates different frequencies between an uplink and a downlink in the first carrier frequency and communicates with the mobile terminal apparatus, and the local area base station apparatus dynamically switches between the uplink and the downlink in the second carrier frequency on a per time basis based on a communication environment, and communicates with the mobile terminal apparatus.

Technical Advantage of the Invention

According to the present invention, uplink and downlink communication is carried out by dynamically time-dividing a second carrier frequency for local areas based on the communication environment, so that it is possible to realize a communication system, a local area base station apparatus, a mobile terminal apparatus and a communication method that are suitable for local areas where there is significant variation of traffic.

BRIEF DESCRIPTION OF THE DRAWINGS

FIG. 4 shows a table to list differences between a wide area and a local area;

DESCRIPTION OF EMBODIMENTS

Figure 1:
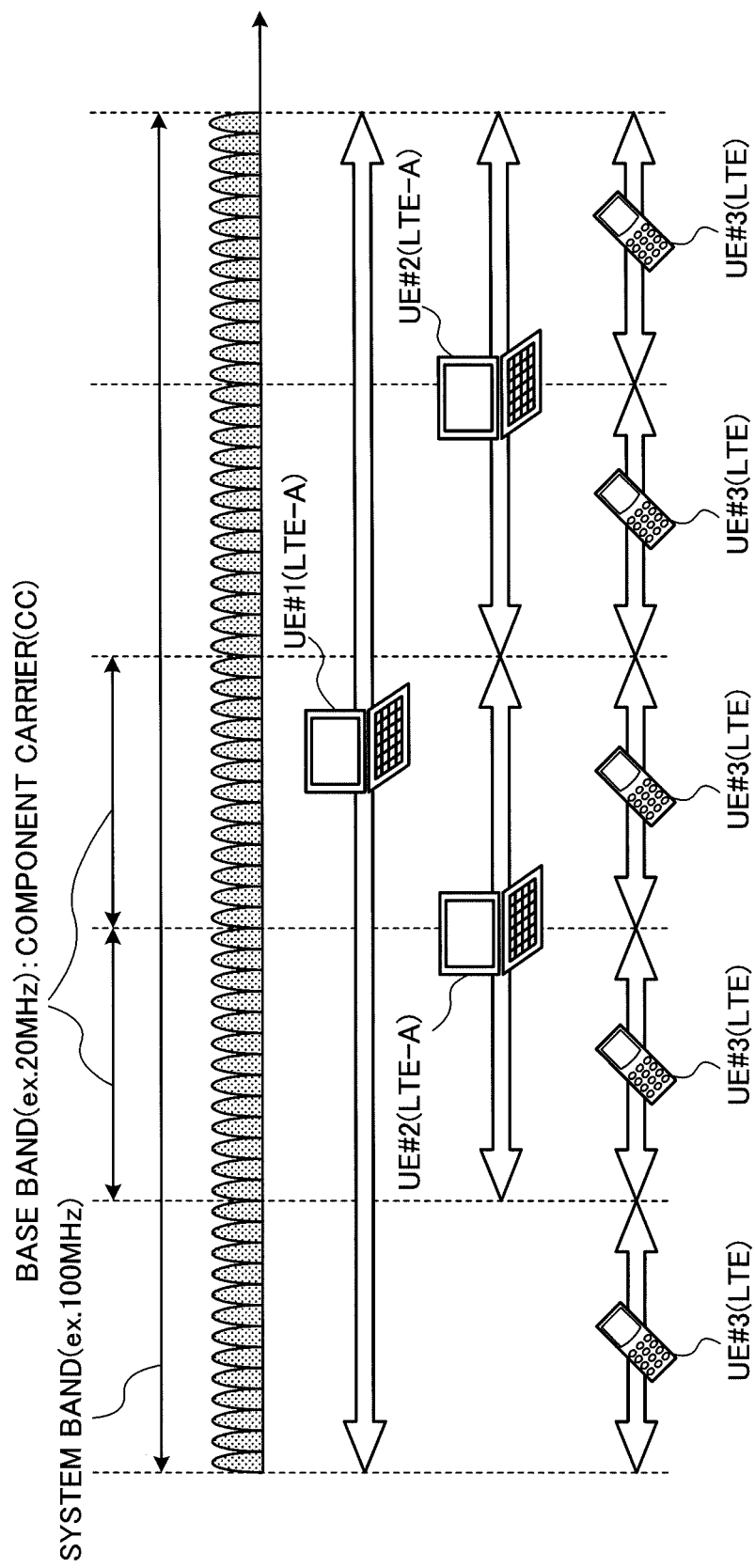
FIG. 1 is a diagram to explain a system band in an LTE-A system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Figure 2:
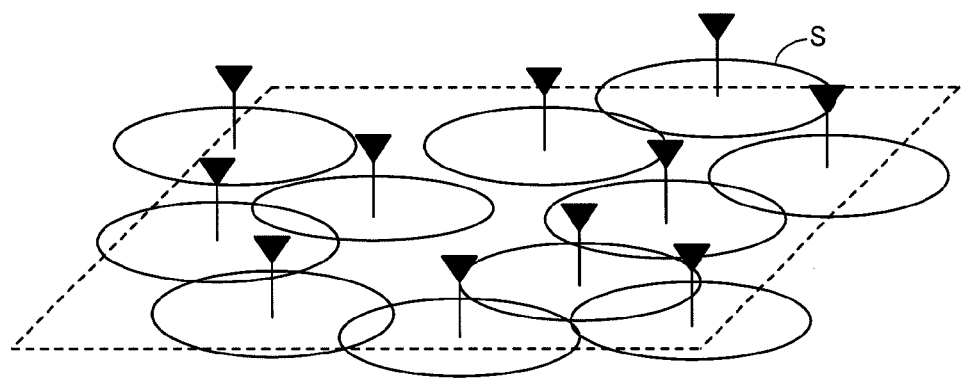
FIG. 2 is a diagram to show a configuration to arrange many small cells in a macro cell.

Now, future systems may anticipate a configuration to arrange numerous small cell S's in a macro cell, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. Also, as demands apart from capacity, small cell S's are required to support saved power consumption on the mobile terminal apparatus side, random cell planning, and so on.

Figure 3A:
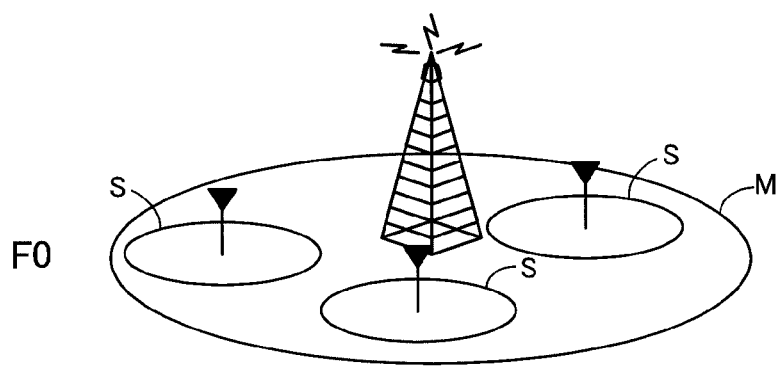
FIG. 3 provides diagrams to show two kinds of heterogeneous network configurations.
Figure 3B:
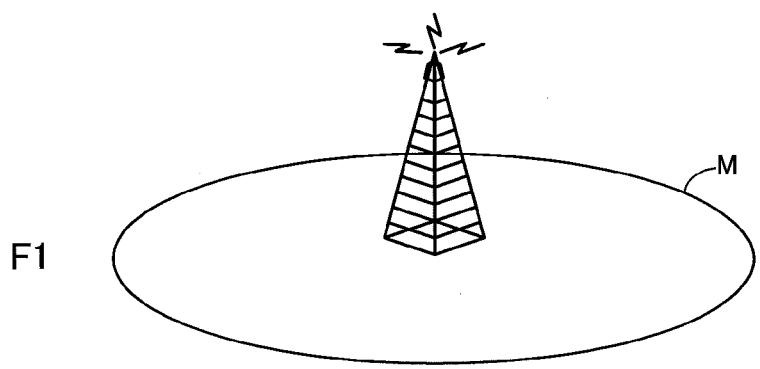
Figure 3B:
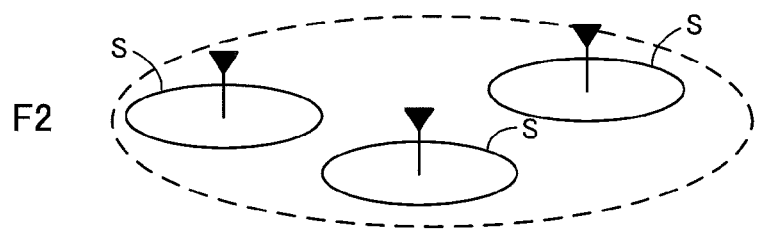

When small cell S's are arranged in a macro cell M, two kinds of heterogeneous network (hereinafter referred to as "HetNet") configurations may be possible, as shown in FIGS. 3A and 3B. In the first HetNet configuration shown in FIG. 3A, the small cell S's are arranged such that the macro cell M and the small cell S's use the same carrier frequency. In the second HetNet configuration shown in FIG. 3B, the small cell S's are arranged such that the macro cell M and the small cell S's use different carrier frequencies. In the second HetNet configuration, the small cell S's use a dedicated carrier frequency, so that it is possible to secure coverage with the macro cell M and secure capacity with the small cell S's. It is expected that, in the future (Rel. 12 and later versions), this second HetNet configuration will become more important.

As shown in FIG. 4, in the second HetNet configuration, varying demands and differences in configuration may exist between the wide area (macro cell) and the local areas (small cells). A wide area has a limited bandwidth, so that spectral efficiency is very important. By contrast with this, a local area makes it easy to take a wide bandwidth, so that, if a wide bandwidth can be secured, the significance of spectral efficiency is not as high as in a wide area. While a wide area needs to support high mobility such as represented by cars and/or the like, a local area has only to support low mobility. A wide area needs to secure wide coverage. Although it is preferable to secure wide coverage with a local area as well, a wide area can cover up the shortage of coverage.

Although, in a wide area, the uplink-downlink power difference is significant and the uplink and the downlink are asymmetrical, in a local area, the uplink-downlink power difference is insignificant, and the uplink and the downlink are nearly symmetrical. Furthermore, in a wide area, the number of connecting users per cell is high and cell planning is applied, so that there is little variation of traffic. By contrast with this, in a local area, the number of connecting users per cell is low, and furthermore there is a possibility that cell planning is not applied, so that there is significant variation of traffic. In this way, since optimal requirements for a local area are different from those of a wide area, it is necessary to design radio communication schemes that are specifically designed for local areas.

For example, to focus on local area traffic, the ratio of uplink and downlink traffic may vary significantly depending on the number of mobile terminal apparatuses connected, the applications used, and so on. So, if a radio communication scheme for local areas can be configured to cope with the variation of traffic between the uplink and the downlink, it is possible to realize more efficient communication. Given this problem, the present inventors have come up with the idea that it may be possible to flexibly cope with the variation of traffic between the uplink and the downlink in a local area by dynamically switching between the uplink and the downlink of the carrier frequency for the local area, on a per time basis, based on the communication environment. That is to say, a gist of the present invention is to allocate different frequencies to the uplink and the downlink of the carrier frequency for a wide area and allow communication with a mobile terminal apparatus, and furthermore dynamically switch between the uplink and the downlink of the carrier frequency for a local area, on a per time basis, and allow communication with a mobile terminal apparatus.

Figure 5:
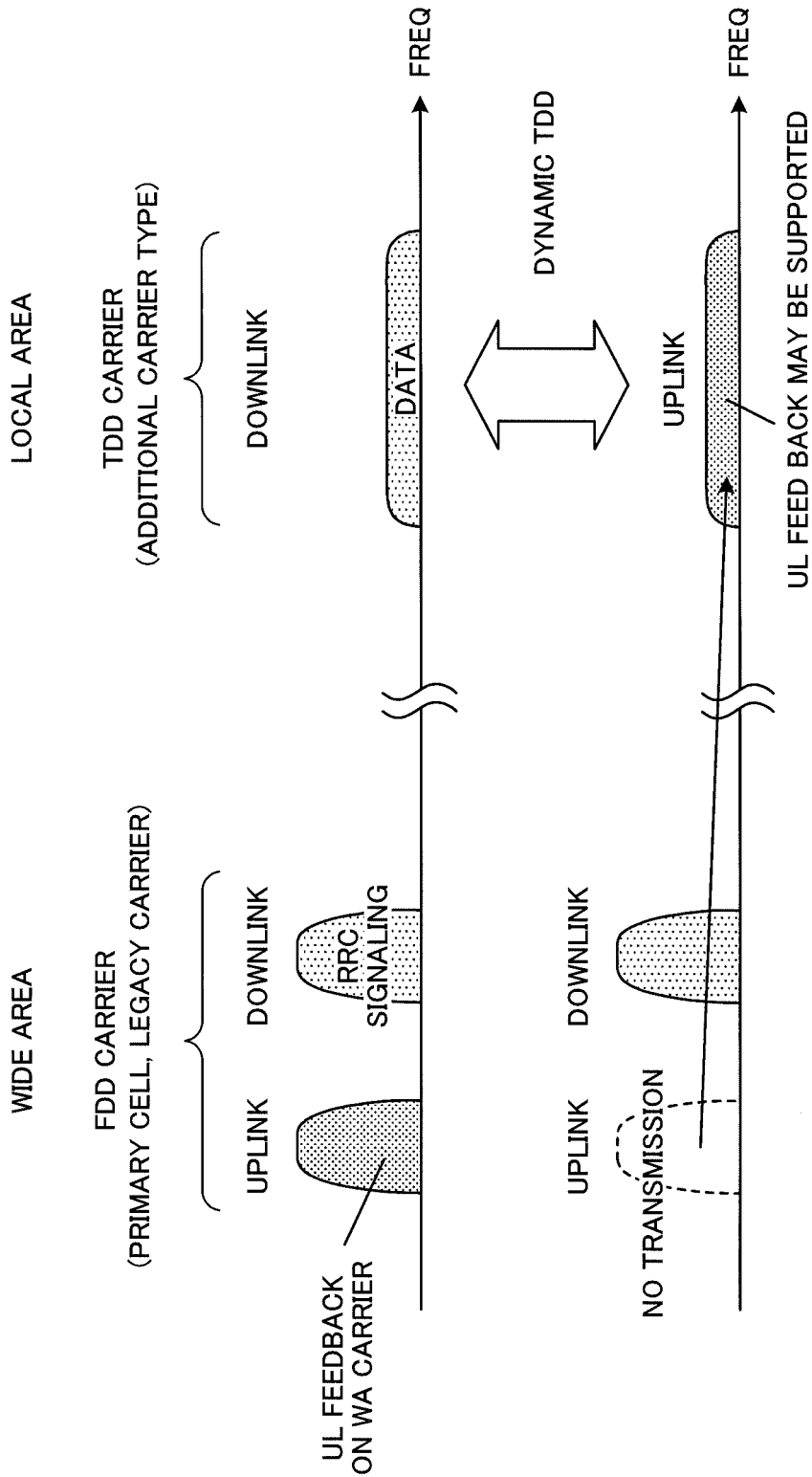
FIG. 5 is a diagram to show an example of radio resource configurations for a wide area and a local area.

Now, a new radio communication scheme will be described with reference to FIG. 5. FIG. 5 is a diagram to show examples of radio resource configurations in a wide area and a local area. As shown in FIG. 5, a legacy carrier type is set in the wide area. Also, in the local area, an additional carrier type, which has no compatibility with legacy component carriers, is set. Note that an additional carrier type may be referred to as an extension carrier as well.

As shown in FIG. 5, the legacy carrier type is presumed for use in a PCell (Primary Cell), and adopts frequency-division duplexing (FDD) to carry out uplink and downlink communication in different frequencies (pair band). Consequently, the legacy carrier type may be referred to as the "FDD carrier." FDD can always secure, on the uplink and the downlink, a period in which transmission is possible.

The additional carrier type is primarily presumed for use in an SCell (Secondary Cell), and adopts time-division duplexing (TDD) to carry out uplink and downlink communication separately in time. The additional carrier type may be referred to as the "TDD carrier." As shown in FIG. 5, while downlink communication is carried out using the TDD carrier, no uplink communication is carried out using the TDD carrier, and, while uplink communication is carried out using the TDD carrier, no downlink communication is carried out using the TDD carrier. Switching between the uplink and the downlink of the TDD carrier is made based on the traffic of surrounding local areas, feedback information from mobile terminal apparatuses, wide area control information and so on, taking into account the system's communication environment.

As exemplified in FIG. 5, while downlink communication is carried out using the TDD carrier for the local area, in the FDD carrier for the wide area, uplink and downlink communication is carried out using different frequency bands. In this way, simultaneous downlink communication (simultaneous reception in mobile terminal apparatuses) by the FDD carrier and the TDD carrier is supported, and downlink carrier aggregation is made possible. By carrying out downlink communication using carrier aggregation, it is possible to increase the downlink communication speed. However, it is not strictly necessary to carry out downlink communication using carrier aggregation, and, for example, it is also possible to perform downlink communication using the TDD carrier alone.

Here, the type of downlink traffic to be transmitted from the base station apparatus of the wide area through the FDD carrier and the type of downlink traffic to be transmitted from the base station apparatus of the local area through the TDD carrier may be differentiated. For example, it may be possible to transmit control signals such as the downlink control signal (PDCCH), the broadcast signal (PBHC), higher layer signaling (for example, RRC signaling) and so on through the FDD carrier, and transmit user data and/or the like through the TDD carrier. However, the type of traffic transmitted in each carrier is by no means limited to these.

While uplink communication is carried out in the local area's TDD carrier, in the wide area's FDD carrier, downlink communication is carried out using part of the band. In this way, while uplink communication is carried out using the TDD carrier, the uplink of the FDD carrier assumes non-transmission, and simultaneous uplink transmission from a mobile terminal apparatus through the FDD carrier and the TDD carrier is prevented.

That is, carrier aggregation is not used on the uplink, and uplink frequency resources are switched between the FDD carrier and the TDD carrier. In this way, by preventing simultaneous transmission from a mobile terminal apparatus, it is possible to prevent complication of transmission control in the mobile terminal apparatus. Also, by preventing simultaneous transmission on the uplink, it is not necessary to reduce the transmission power of the mobile terminal apparatus, and this may be effective to secure coverage.

In this radio communication scheme, it is possible to report feedback information from a mobile terminal apparatus through the uplink of the FDD carrier. In the TDD carrier, too, it is preferable to support uplink feedback. By doing so, feedback traffic from the mobile terminal apparatus can be off-loaded with the TDD carrier, so that the load on the FDD carrier can be lightened. Also, since feedback can be sent directly to the base station apparatus constituting the local area (local area base station apparatus) through the TDD carrier, in a configuration in which, for example, a local area base station apparatus is placed apart from the base station apparatus constituting the wide area (wide area base station apparatus), it is not necessary to send feedback to the local area base station apparatus via the wide area base station apparatus. By this means, it is possible to improve the efficiency of communication.

When the TDD carrier is designed to support uplink feedback, the uplink control channel for transmitting feedback information can be allocated periodically so as to prevent simultaneous transmission between the FDD carrier and the TDD carrier. For example, while there is no uplink transmission through the FDD carrier, it is possible to transmit the uplink control channel through the uplink of the TDD carrier. Also, it is preferable to allocate the uplink control channel on a dynamic basis. As feedback information to be transmitted through the uplink of the TDD carrier, there are, for example, downlink radio quality information (CQI: Channel Quality Indicators), ACK/NACK and so on. However, feedback information is by no means limited to these.

Figure 6:
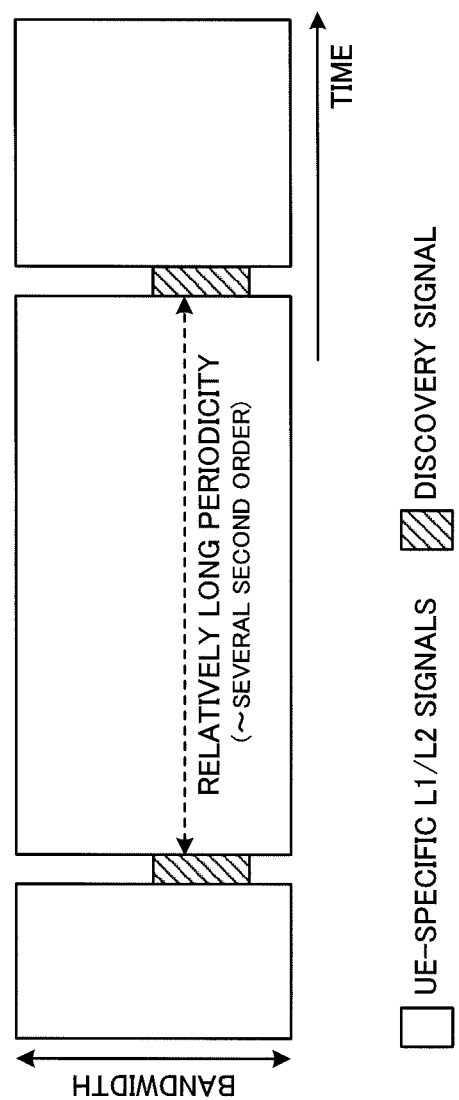
FIG. 6 is a diagram to show an example of a local area radio communication scheme.

Next, the connection sequence in the above radio communication scheme will be described. First, an example of the basic radio interface configuration will be described. Considering interference that arises from saved power consumption and random cell planning, it is preferable to configure a radio communication scheme for local areas to assume non-transmission when there is no traffic. Consequently, as shown in FIG. 6, a radio communication scheme for local areas is expected to be designed as UE-specific as possible. Consequently, a radio communication scheme for local areas is designed based on EPDCCHs (Enhanced Physical Downlink Control Channels) and DM-RSs (Demodulation—Reference Signals), without using PSS/SSSs (Primary Synchronization Signal/Secondary Synchronization Signals), CRSs (Cell-specific Reference Signals), PDCCHs (Physical Downlink Control Channels) and so on in LTE.

An EPDCCH refers to a predetermined frequency band that lies within the PDSCH region (data signal region) and that is used as a PDCCH region (control signal region). EPDCCHs allocated in the PDSCH region are demodulated using DM-RSs. Note that an EPDCCH may be referred to as an "FDM-type PDCCH" or may be referred to as a "UE-PDCCH." Also, in this radio communication scheme for the local area, the above-described TDD carrier is used. Note that, in FIG. 6, the PDSCH (Physical Downlink Shared Channel), EPDCCHs, DM-RSs and so on are shown as UE-specific L1/L2 signals.

When everything is designed UE-specific in a radio communication scheme for local areas, a mobile terminal apparatus cannot have the opportunity to make initial access to the local areas. Consequently, in a radio communication scheme for local areas, too, it is necessary to provide cell-specific synchronization signals. The synchronization signals are transmitted in a relatively long cycle on the order of several seconds, so that the mobile terminal apparatus can save battery. The mobile terminal apparatus recognizes the times to receive synchronization signals from each local area by means of control information from the wide area, and measures each local area's received signal power at these times of reception. The mobile terminal apparatus is assigned an adequate local area (transmission point) in accordance with the received signal power of synchronization signals.

Figure 7:
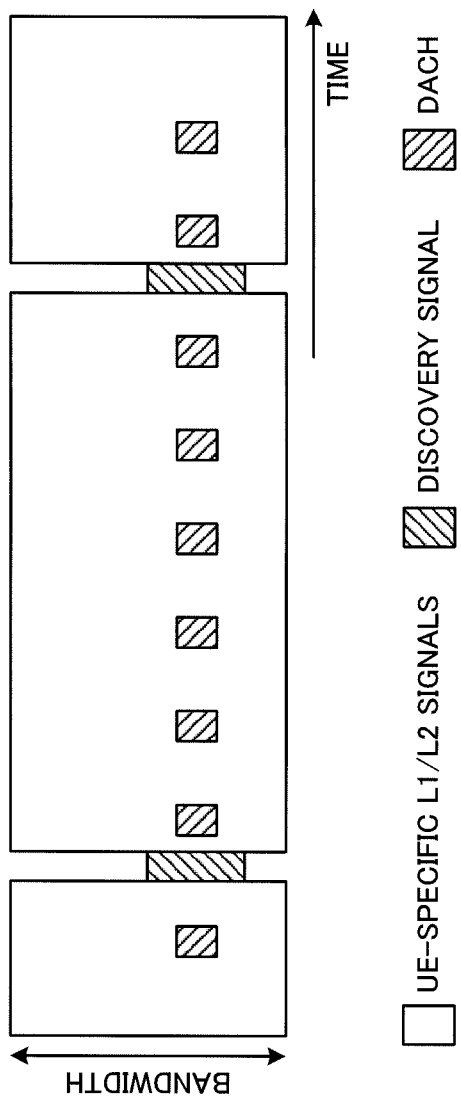
FIG. 7 is a diagram to show an example of a DACH arrangement configuration.

With the above HetNet configuration, there is a problem that the wide area and the local area need to coordinate and that the procedures which a mobile terminal apparatus has to take to establish connection with the local area are complex. So, for example, as shown in FIG. 7, in a local area that is designed UE-specific, an arrangement configuration to provide an uplink channel for reporting synchronization signal measurement results to make the initial access simple may be possible. By this means, it is possible to make the initial access simple and quickly establish connection after traffic is produced in a mobile terminal apparatus.

In the radio communication scheme for a local area, the synchronization signal for the local area is referred to as the "discovery signal." In the radio communication scheme for the local area, the uplink channel that is defined for reporting discovery signal measurement results is referred to as the "DACH" (Direct Access Channel). Note that the discovery signal may be referred to as, for example, the PDCH (Physical Discovery Channel), the BS (Beacon Signal), the DPS (Discovery Pilot Signal) and so on. The DACH is not limited to a particular name. The radio communication scheme may be referred to as a "radio interface" or may be referred to as a "radio interface scheme." The wide area may be a macro cell, a sector and/or the like. The local area may be a small cell, a pico cell, a nano cell, a femto cell, a micro cell and so on, and may be provided indoors as well as outdoors.

In the radio communication scheme for the local area, discovery signals are transmitted in a long cycle so that a mobile terminal apparatus is able to reduce the number of times of measurement and save battery. In the arrangement configuration shown in FIG. 7, radio resources are allocated to the uplink DACH with comparatively high frequency (in a short cycle). By means of this DACH used with high frequency, uplink connection is established quickly when traffic is produced in a mobile terminal apparatus.

Figure 8:
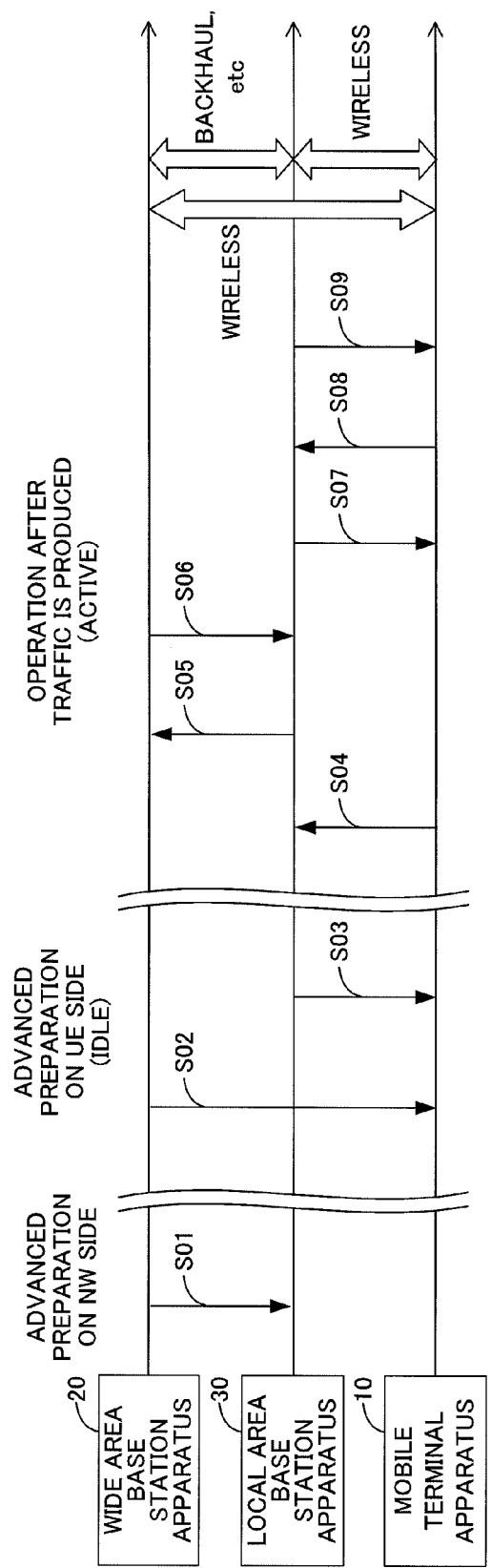
FIG. 8 is a diagram to show an example of a local area connection sequence.

Next, the connection sequence will be described. In the following description, a configuration to arrange a plurality of local areas in a wide area will be exemplified (see FIG. 9). As shown in FIG. 8, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S01). The control information for discovery signal transmission includes, for example, radio resource information and signal sequence information for transmitting discovery signals to the mobile terminal apparatus 10. The signal sequence of the discovery signal is set for each local area, and the local areas are identified by this signal sequence.

Next, in an idle state, the mobile terminal apparatus 10 receives control information for discovery signal reception, control information for DACH transmission, and control information for EPDCCH reception, from the wide area base station apparatus 20 (step S02). That is, the mobile terminal apparatus 10 receives each control information on the downlink of the FDD carrier. The control information for discovery signal reception includes, for example, radio resource information and signal sequence information for receiving discovery signals from each local area base station apparatus 30. The control information for DACH transmission includes, for example, radio resource information and DM-RS sequence information for transmission to the local area base station apparatus 30 through the DACH. The control information for EPDCCH reception includes, for example, radio resource information and DM-RS sequence information for reception from the local area base station apparatus 30 through EPDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S03). That is, the mobile terminal apparatus 10 receives discovery signals transmitted on the downlink of the TDD carrier and measures the received signal power. Then, as traffic is produced in the mobile terminal apparatus 10, the mobile terminal apparatus 10 shifts from an idle state to an active state.

Upon the shift to an active state, the discovery signal measurement results and user IDs of the top several stations among a plurality of local area base station apparatuses 30 are transmitted from the mobile terminal apparatus 10 to the nearest local area base station apparatus 30 through the DACH (step S04). That is, the nearest local area base station apparatus 30 receives the DACH through the uplink of the TDD carrier. Also, by means of the control information for DACH transmission received from the wide area base station apparatus 20 in step S02, the mobile terminal apparatus 10 is prepared in advance for transmission using the DACH. Note that the mobile terminal apparatus 10 may determine the nearest local area base station apparatus 30 based on the magnitude of the received signal power of the discovery signals (for example, based on the highest received signal power). Also, the user IDs may be IDs that are randomly selected by the mobile terminal apparatus 10 (for example, RACH-IDs).

Next, the discovery signal measurement results and user IDs of the top several stations, received from the mobile terminal apparatus 10, are transferred from the nearest local area base station apparatus 30 to the wide area base station apparatus 20 (step S05). The wide area base station apparatus 20 assigns an adequate local area base station apparatus to the mobile terminal apparatus 10 based on the discovery signal measurement results of the top several stations, and sets the initial downlink transmission power in the local area base station apparatus 30 (step S06). At this time, the wide area base station apparatus 20 adjusts the load balance between the local areas and assigns the local area base station apparatus 30 to the mobile terminal apparatus 10. Consequently, the mobile terminal apparatus 10 is not necessarily assigned the local area base station apparatus 30 of the highest received signal power. Also, the wide area base station apparatus 20 may be configured to assign a plurality of local area base station apparatuses 30 to the mobile terminal apparatus 10 and carry out CoMP (Coordinated Multiple Point) transmission.

Then, from the assigned local area base station apparatus 30 to the mobile terminal apparatus 10, downlink control signals are transmitted through a control channel (EPDCCH) and user data is transmitted through a data channel (PDSCH) (step S07). That is, the mobile terminal apparatus 10 receives the control channel and the data channel through the downlink of the TDD carrier. Also, by means of the control information for EPDCCH reception received from the wide area base station apparatus 20 in step S02, the mobile terminal apparatus 10 is prepared in advance for reception using EPDCCHs.

When initial connection is established between the mobile terminal apparatus 10 and the local area base station apparatus 30 in this way, uplink and downlink communication using the TDD carrier is started between the mobile terminal apparatus 10 and the local area base station apparatus 30 (steps S08 and S09). The uplink and downlink transmission time intervals (TTIs) are controlled dynamically in the scheduler of the local area base station apparatus 30, based on the traffic of the surrounding local areas, feedback information from the mobile terminal apparatus, control information for the wide area, and so on.

Figure 9:
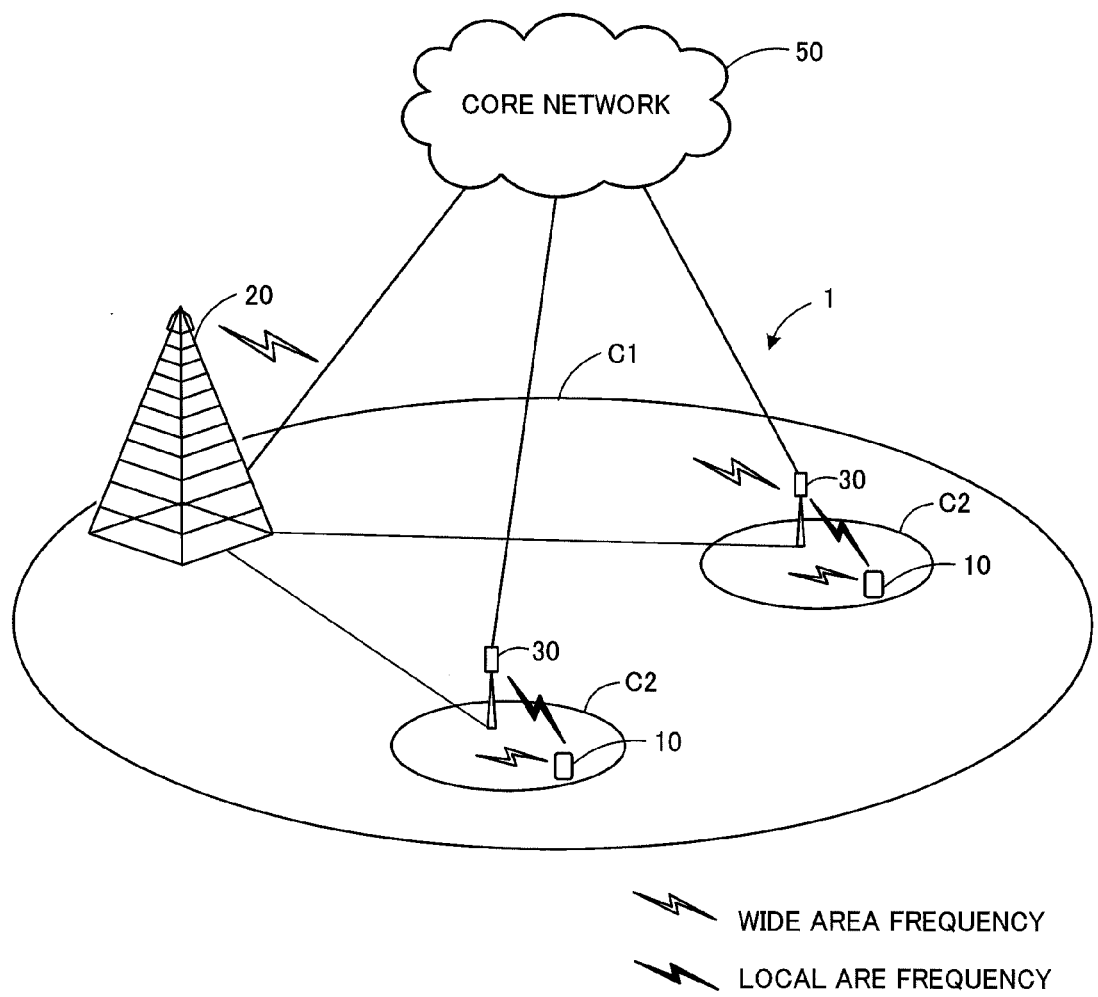
FIG. 9 is a diagram to explain a system configuration of a radio communication system.

Now, the radio communication system according to the present embodiment will be described in detail. FIG. 9 is a diagram to explain a system configuration of a radio communication system according to the present embodiment. Note that the radio communication system shown in FIG. 9 is a system to accommodate, for example, the LTE system or SUPER 3G. This radio communication system supports carrier aggregation, which groups a plurality of fundamental frequency blocks into one, where the system band of the LTE system is one unit. Also, this radio communication system may be referred to as "IMT-Advanced," or may be referred to as "4G," "FRA" (Future Radio Access) and so on.

As shown in FIG. 9, the radio communication system 1 has a wide area base station apparatus 20 that covers a wide area C1, and a plurality of local area base station apparatuses 30 that cover a plurality of local areas C2 provided inside the wide area C1. Also, in the wide area C1 and each local area C2, many mobile terminal apparatuses 10 are arranged. The mobile terminal apparatuses 10 support the radio communication schemes for the wide area and the local areas, and are configured to be able to perform radio communication with the wide area base station apparatus 20 and the local area base station apparatuses 30.

Communication between the mobile terminal apparatuses 10 and the wide area base station apparatus 20 is carried out using the frequency for the wide area (for example, a low frequency band). Communication between the mobile terminal apparatuses 10 and the local area base station apparatuses 30 is carried out using the frequency for the local areas (for example, a high frequency band). Also, the wide area base station apparatus 20 and each local area base station apparatus 30 are connected with each other by wire connection or by wireless connection.

The wide area base station apparatus 20 and each local area base station apparatus 30 are connected with a higher station apparatus, which is not illustrated, and are connected to a core network 50 via a higher station apparatus. Note that the higher station apparatus may be, for example, an access gateway apparatus, a radio network controller (RNC), a mobility management entity (MME) and so on, but is by no means limited to these. Also, the local area base station apparatuses 30 may be connected with the higher station apparatus via the wide area base station apparatus 20.

Although each mobile terminal apparatus 10 may be either an LTE terminal or an LTE-A terminal, in the following description, simply a mobile terminal apparatus will be described, unless specified otherwise. Also, although the mobile terminal apparatus will be described to perform radio communication with the wide area base station apparatus 20 and the local area base station apparatuses 30 for ease of explanation, more generally, user equipment (UE), including both mobile terminal apparatuses and fixed terminal apparatuses, may be used as well. Also, the local area base station apparatuses 30 and the wide area base station apparatus 20 may be referred to as wide area and local area transmission points.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each mobile terminal apparatus 10 on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 10:
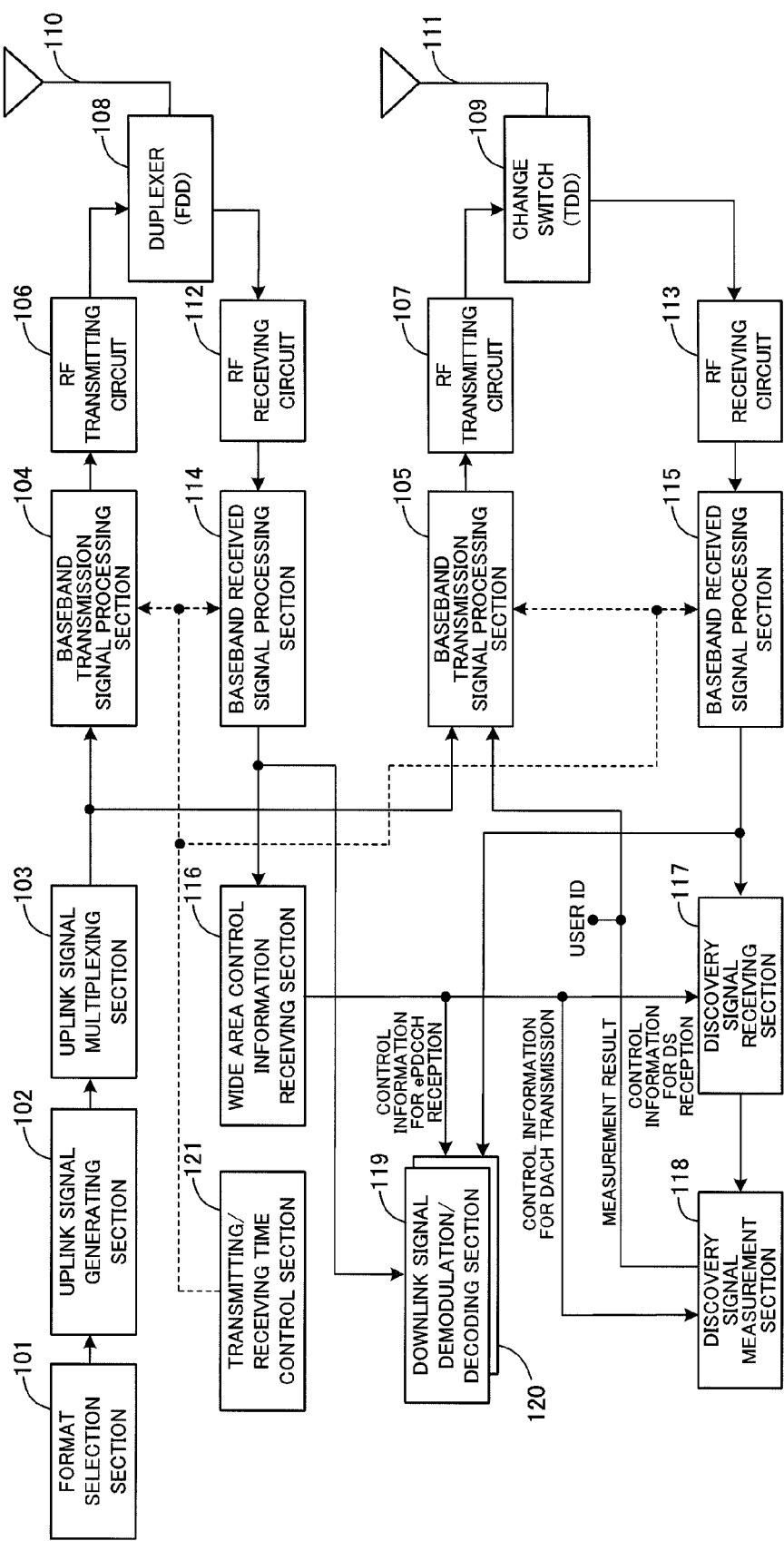
FIG. 10 is a diagram to show an overall configuration of a mobile terminal apparatus.

An overall configuration of the mobile terminal apparatuses 10 will be described with reference to FIG. 10. The mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects the transmission format for the wide area and the transmission format for the local areas. The uplink signal generating section 102 generates uplink data signals and reference signals. In the event of the transmission format for the wide area, the uplink signal generating section 102 generates the uplink data signal and reference signal for the wide area base station apparatus 20. Also, in the event of the transmission format for the local areas, the uplink signal generating section 102 generates the uplink data signal and reference signal for the local area base station apparatus 30.

The uplink signal multiplexing section 103 multiplexes the uplink transmission data and the reference signal. An uplink signal for the wide area base station apparatus 20 is input in the baseband transmission signal processing section 104, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 106, and is transmitted from a transmitting/receiving antenna 110 for the wide area, via a duplexer 108 that is provided between the transmitting sequence and the receiving sequence. In the transmitting/receiving sequences for the wide area, simultaneous transmission/reception is made possible by the duplexer 108.

An uplink signal for the local area base station apparatus 30 is input in the baseband transmission signal processing section 105, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 111 for the wide area, via a change switch 109 that is provided between the transmitting sequence and the receiving sequence. In the transmitting/receiving sequences for the local areas, transmission and reception are switched by a change switch 109.

Note that, with the present embodiment, uplink signals for the wide area and the local areas are prevented from simultaneous transmission, and are transmitted at separate times by switching between the transmitting/receiving antennas 110 and 111.

Also, the mobile terminal apparatus 10, has, as processing sections of the receiving sequence, RF receiving circuits 112 and 113, baseband received signal processing sections 114 and 115, a wide area control information receiving section 116, a discovery signal receiving section 117, a discovery signal measurement section 118, and downlink signal demodulation/decoding sections 119 and 120.

A downlink signal from the wide area base station apparatus 20 is received in the wide area transmitting/receiving antenna 110. This downlink signal is input in the baseband received signal processing section 114 via the duplexer 108 and the RF receiving circuit 112, and subjected to digital signal processing. For example, in the event of a downlink signal of the OFDM scheme, the cyclic prefixes are removed, and the signal is converted from a time sequence signal to a frequency domain signal through a fast Fourier transform (FFT).

The wide area control information receiving section 116 receives wide area control information from the downlink signal for the wide area. Here, as the wide area control information, control information for discovery signal reception, control information for DACH transmission, and control information for EPDCCH reception are received. The wide area control information receiving section 116 outputs the control information for discovery signal reception to the discovery signal receiving section 117, outputs the control information for DACH transmission to the discovery signal measurement section 118, and outputs the control information for EPDCCH reception to the downlink signal demodulation/decoding section 120. Note that the wide area control information is received by means of, for example, broadcast information, RRC signaling (higher layer signaling) and so on. The downlink data signal for the wide area is input in the downlink signal demodulation/decoding section 119, and decoded (descrambled) and demodulated in the downlink signal demodulation/decoding section 119.

A downlink signal from the local area base station apparatus 30 is received in the transmitting/receiving antenna 111 for the local areas. This downlink signal is input in the baseband received signal processing section 115 via the change switch 109 and the RF receiving circuit 113, and is subjected to digital signal processing. For example, in the event of a downlink signal of the OFDM scheme, the cyclic prefixes are removed, and the signal is converted from a time sequence signal to a frequency domain signal through a fast Fourier transform (FFT).

The discovery signal receiving section 117 receives the discovery signal from the local area base station apparatus 30 based on the control information for discovery signal reception input from the wide area control information receiving section 116. The control information for discovery signal reception includes, for example, radio resource information and signal sequence information for receiving discovery signals from each local area base station apparatus 30. The radio resource information includes, for example, the transmission interval, the frequency position, and the code of the discovery signals.

The discovery signal measurement section 118 periodically measures the received signal power of the discovery signals received in the discovery signal receiving section 117. Among the discovery signals from each local area base station apparatus 30, the discovery signal measurement section 118 transmits the measurement results of the top several stations (for example, the top three stations) where the received signal power is high, to the local area base station apparatus 30 by means of the DACH. In this case, the discovery signal measurement section 118 specifies the local area of the transmission destination based on the signal sequences of discovery signals.

Note that transmission by means of the DACH is carried out based on the control information for DACH transmission input from the wide area control information receiving section 116. The control information for DACH transmission includes, for example, radio resource information and DM-RS sequence information for transmission to the local area base station apparatus 30 by means of the DACH. The radio resource information includes, for example, the transmission interval, the frequency position, and the code of the DACH.

A downlink data signal for the local areas is input in a downlink signal demodulation/decoding section 120, and decoded (descrambled) and demodulated in the downlink signal demodulation/decoding section 120. Also, based on the control information for EPDCCH reception input from the wide area control information receiving section 116, the downlink signal demodulation/decoding section 120 decodes (descrambles) and demodulates the local area downlink control signal (EPDCCH). The control information for EPDCCH reception includes, for example, radio resource information and DM-RS sequence information for reception from the local area base station apparatus 30 by means of EPDCCHs. The radio resource information includes, for example, the transmission interval, the frequency position, and the code of EPDCCHs.

Also, downlink signals for the wide area and the local areas may be received simultaneously from the transmitting/receiving antennas 110 and 111, or may be received separately by switching between the transmitting/receiving antennas 110 and 111.

The mobile terminal apparatus 10 has a transmitting/receiving time control section 121 that controls the operations of the baseband transmission signal processing sections 104 and 105 and the baseband received signal processing sections 114 and 115. The transmitting/receiving time control section 121 controls the times of uplink and downlink communication based on scheduling information from the wide area base station apparatus 20 and the local area base station apparatus 30. The uplink and downlink transmission time intervals (TTIs) for the local areas (TDD carrier) are controlled dynamically by the transmitting/receiving time control section 121. This control is carried out based on the communication environment.

For example, when the mobile terminal apparatus 10 receives through the TDD carrier (downlink), the transmitting/receiving time control section 121 makes the baseband received signal processing section 115 operate and also makes the baseband transmission signal processing section 105 stop. At this time, it is possible to carry out transmission/reception using the FDD carrier for the wide area, carry out transmission alone, or carry out reception alone. Also, downlink carrier aggregation may be carried out between the FDD carrier and the TDD carrier.

Also, when the mobile terminal apparatus 10 transmits through the TDD carrier for the local areas (uplink), the transmitting/receiving time control section 121 makes the baseband transmission signal processing section 105 operate and makes the baseband received signal processing section 115 stop. At this time, in the FDD carrier for the wide area, the uplink assumes non-transmission. That is, the transmitting/receiving time control section 121 makes the baseband transmission signal processing section 104 stop. In this way, the baseband transmission signal processing section 104 is stopped while the baseband transmission signal processing section 105 operates, so that uplink carrier aggregation is not carried out between the FDD carrier and the TDD carrier. Downlink reception is still possible with the FDD carrier.

Figure 11:
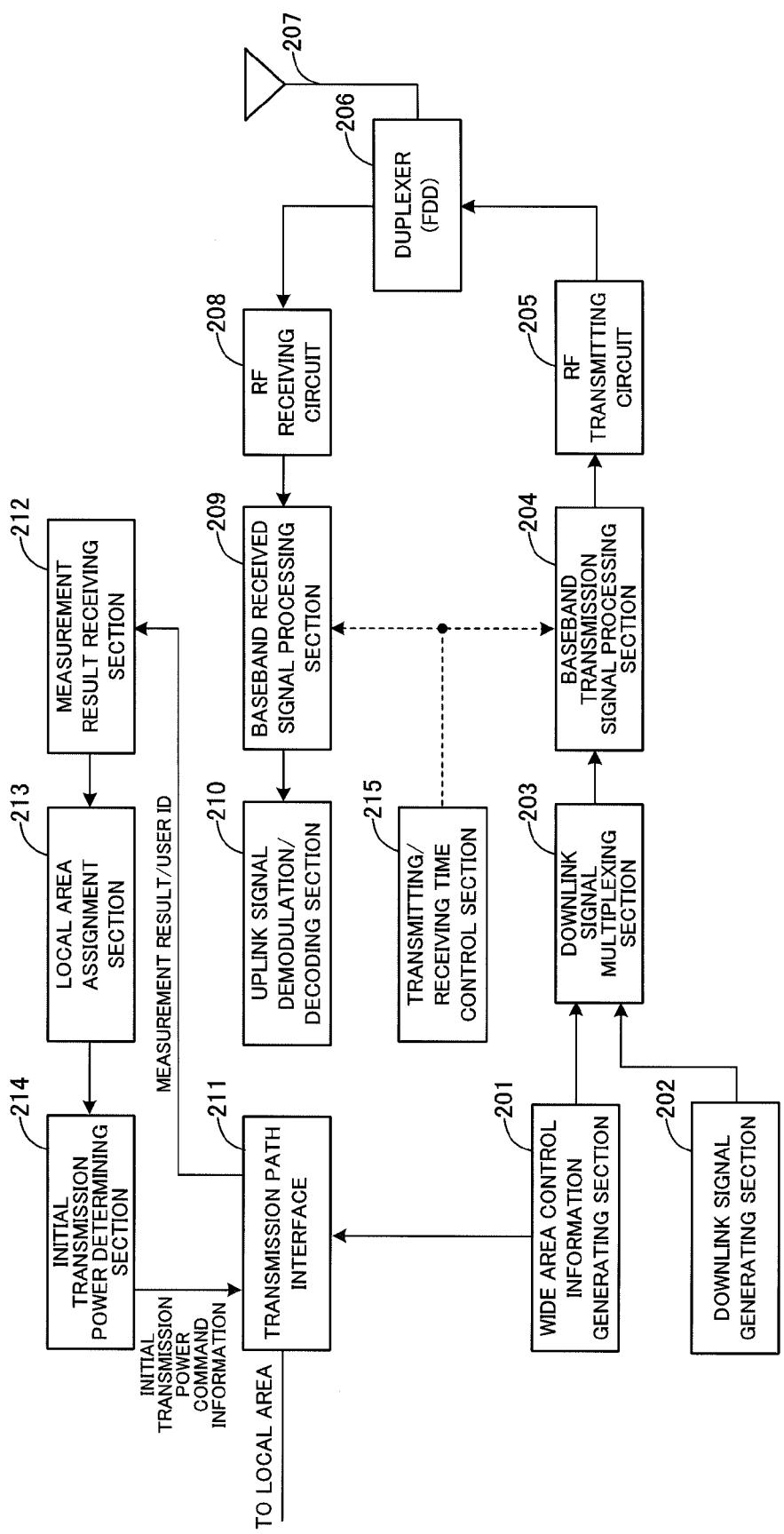
FIG. 11 is a diagram show an overall configuration of a wide area base station apparatus.

An overall configuration of the wide area base station apparatus 20 will be described with reference to FIG. 11.

The wide area base station apparatus 20 has, as processing sections of the transmitting sequence, a wide area control information generating section 201, a downlink signal generating section 202, a downlink signal multiplexing section 203, a baseband transmission signal processing section 204, and an RF transmitting circuit 205.

The wide area control information generating section 201 generates, as wide area control information, control information for discovery signal transmission, control information for discovery signal reception, control information for DACH transmission, and control information for EPDCCH reception. The wide area control information generating section 201 outputs the control information for discovery signal transmission to a transmission path interface 211, and outputs the control information for discovery signal reception, the control information for DACH transmission, and the control information for EPDCCH reception to the downlink signal multiplexing section 203. The control information for discovery signal transmission is transmitted to the local area base station apparatus 30 via the transmission path interface 211. Meanwhile, the control information for discovery signal reception, the control information for DACH transmission, and the control information for EPDCCH reception are transmitted to the mobile terminal apparatus 10 via the downlink signal multiplexing section 203.

The downlink signal generating section 202 generates downlink data signals and reference signals. The downlink signal multiplexing section 203 multiplexes the wide area control information, the downlink data signal and the reference signal. A downlink signal for the mobile terminal apparatus 10 is input in the baseband transmission signal processing section 204, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 205, and is transmitted from the transmitting/receiving antenna 207 via a duplexer 206 that is provided between the transmitting sequence and the receiving sequence.

Also, the wide area base station apparatus 20 has, as processing sections of the receiving sequence, an RF receiving circuit 208, a baseband received signal processing section 209, an uplink signal demodulation/decoding section 210, a measurement result receiving section 212, a local area assignment section 213, and an initial transmission power determining section 214.

An uplink signal from the mobile terminal apparatus 10 is received in the transmitting/receiving antenna 207, and is input in the baseband received signal processing section 209 via the duplexer 206 and the RF receiving circuit 208. In the baseband received signal processing section 209, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 210, and decoded (descrambled) and demodulated in the uplink signal demodulation/decoding section 210.

The measurement result receiving section 212 receives the discovery signal measurement results and user IDs transferred from the local area base station apparatus 30, via the transmission path interface 211. The measurement result receiving section 212 outputs the discovery signal measurement results and user IDs to the local area assignment section 213. Based on the received signal power and the user IDs of the top several stations shown by the discovery signal measurement results, the local area assignment section 213 assigns an adequate local area base station apparatus 30 to the mobile terminal apparatus 10. At this time, the local area assignment section 213 performs the assignment by adjusting the load balance between the local areas.

The initial transmission power determining section 214 determines the initial transmission power (EPDCCH/PDSCH) for the local area base station apparatus 30 assigned to the mobile terminal apparatus 10. The initial transmission power determining section 214 transmits initial transmission power command information to the local area base station apparatus 30 via the transmission path interface 211.

Also, the wide area base station apparatus 20 has a transmitting/receiving time control section 215 that controls the operations of the baseband transmission signal processing section 204 and the baseband received signal processing section 209. The transmitting/receiving time control section 215 controls the times of uplink and downlink communication based on scheduling information from the scheduler (not shown) of the wide area base station apparatus 20.

Figure 12:
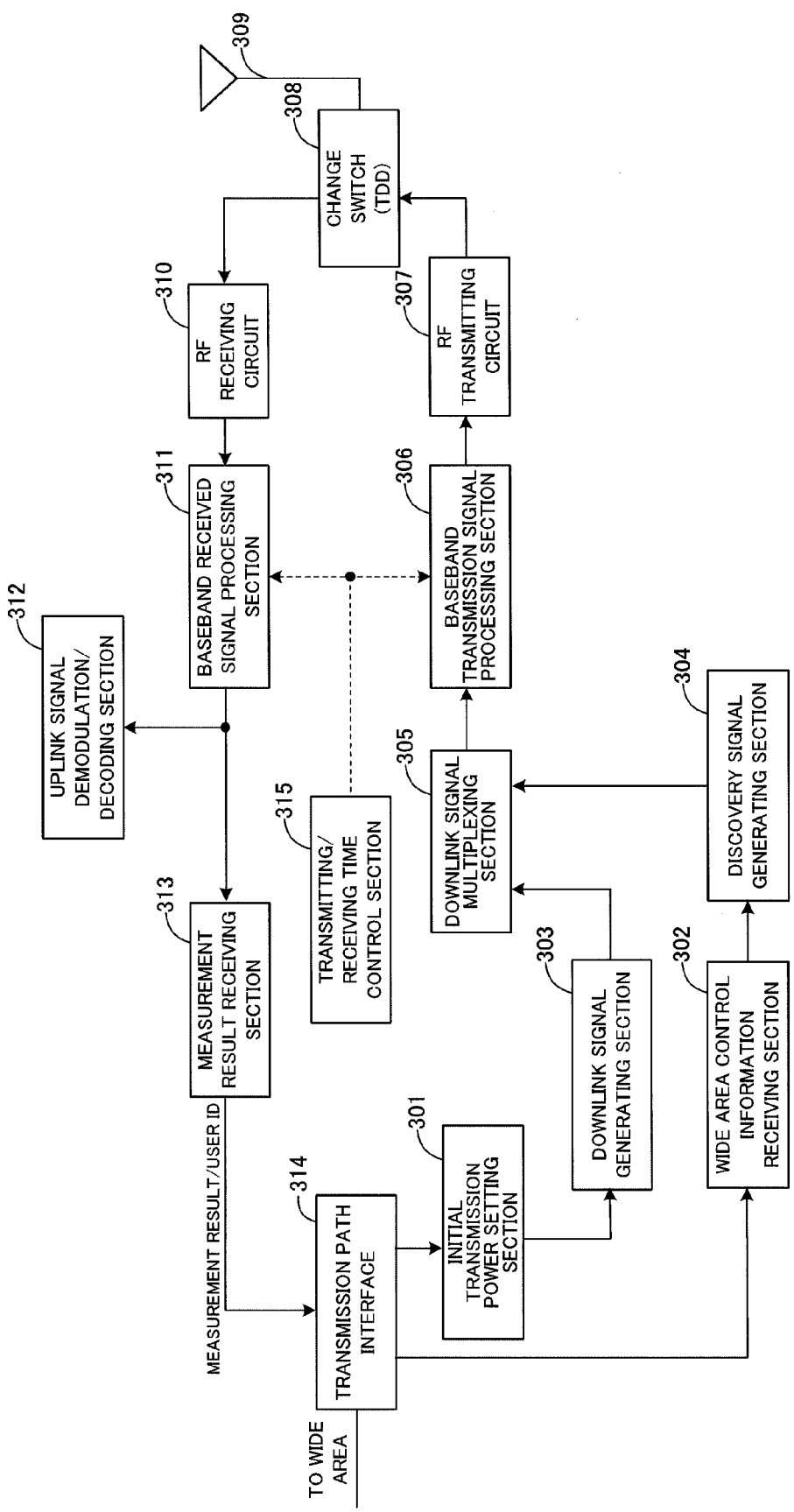
FIG. 12 is a diagram to show an overall configuration of a local area base station apparatus.

An overall configuration of the local area base station apparatus 30 will be described with reference to FIG. 12. Assume that the local area base station apparatus 30 is arranged very close to the mobile terminal apparatus 10. The local area base station apparatus 30 has an initial transmission power setting section 301 and a wide area control information receiving section 302. Also, the local area base station apparatus 30 has, as processing sections of the transmitting sequence, a downlink signal generating section 303, a discovery signal generating section 304, a downlink signal multiplexing section 305, a baseband transmission signal processing section 306, and an RF transmitting circuit 307.

The initial transmission power setting section 301 receives initial transmission power command information from the wide area base station apparatus 20 via the transmission path interface 314. The initial transmission power setting section 301 sets the initial transmission power of the downlink data signal (PDSCH) and the downlink control signal (EPDCCH) based on the initial transmission power command information. The wide area control information receiving section 302 receives wide area control information from the wide area base station apparatus 20 via a transmission path interface 314. Here, as the wide area control information, the control information for discovery signal transmission is received. The wide area control information receiving section 302 outputs the control information for discovery signal transmission to the discovery signal generating section 304.

The downlink signal generating section 303 generates a downlink data signal (PDSCH), a reference signal, and a downlink control signal (EPDCCH). In the downlink signal generating section 303, the initial transmission power of the downlink data signal and the downlink control signal is set by the initial transmission power setting section 301. The discovery signal generating section 304 generates the discovery signal from the local area base station apparatus 30, based on the control information for discovery signal transmission input from the wide area control information receiving section 302. The control information for discovery signal transmission includes, for example, radio resource information and signal sequence information for transmitting discovery signals to the mobile terminal apparatus 10. The radio resource information includes, for example, the transmission interval, the frequency position, and the code of the discovery signals.

The downlink signal multiplexing section 305 multiplexes the downlink transmission data, the reference signal and the downlink control signal. A downlink signal for the mobile terminal apparatus 10 is input in the baseband transmission signal processing section 306, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 307, and is transmitted from a transmitting/receiving antenna 309 via a change switch 308 that is provided between the transmitting sequence and the receiving sequence.

The local area base station apparatus 30 has, as processing sections of the receiving sequence, an RF receiving circuit 310, a baseband received signal processing section 311, an uplink signal demodulation/decoding section 312, and a measurement result receiving section 313.

An uplink signal from the mobile terminal apparatus 10 is received in the transmitting/receiving antenna 309 for the local areas, and input in the baseband received signal processing section 311 via the change switch 308 and the RF receiving circuit 310. In the baseband received signal processing section 311, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 312, and decoded (descrambled) and demodulated in the uplink signal demodulation/decoding section 312.

The measurement result receiving section 313 receives the discovery signal measurement results from the uplink signal. The measurement result receiving section 313 transfers the discovery signal measurement results to the wide area base station apparatus 20 via, for example, a transmission path interface 314.

Also, the local area base station apparatus 30 has a transmitting/receiving time control section 315 that controls the operations of the baseband transmission signal processing section 306 and the baseband received signal processing section 311. The transmitting/receiving time control section 315 controls the times of uplink and downlink communication based on scheduling information from the scheduler (not shown) of the local area base station apparatus 30. For example, the scheduling section designs scheduling to switch between the uplink and the downlink of the TDD carrier based on the communication environment, and sends report to the transmitting/receiving time control section 315. The communication environment is estimated based on, for example, the traffic of the surrounding local areas reported from the surrounding local area base station apparatuses 30 via the wide area base station apparatus 20, feedback information from the mobile terminal apparatus 10, and control information reported from the wide area base station apparatus 20.

For example, when the local area base station apparatus 30 performs transmission through the TDD carrier (downlink), the transmitting/receiving time control section 315 makes the baseband transmission signal processing section 306 operate and makes the baseband received signal processing section 311 stop based on the scheduling information. That is, while the TDD carrier is used on the downlink, the TDD carrier is not used on the uplink. Note that downlink carrier aggregation may be carried out between the wide area FDD carrier and the local area TDD carrier.

Also, when the local area base station apparatus 30 performs reception through the TDD carrier (uplink), the transmitting/receiving time control section 315 makes the baseband received signal processing section 311 operate and makes the baseband transmission signal processing section 306 stop based on the scheduling information. That is, while the TDD carrier is used on the uplink, the TDD carrier is not used on the downlink. Also, uplink carrier aggregation may not be carried out between the wide area FDD carrier and the local area TDD carrier.

As described above, with the radio communication system 1 according to the present embodiment, it is possible to dynamically switch between the uplink and the downlink according to the communication environment by using the TDD carrier for the local areas, so that it is possible to realize communication suitable for the local areas. Also, since simultaneous transmission from the mobile terminal apparatus 10 to the wide area base station apparatus 20 and the local area base station apparatus 30 is prevented, it is possible to prevent complication of transmission control in the mobile terminal apparatus, and also prevent the decrease of transmission power in the mobile terminal apparatus 10. The radio communication system 1 according to the present embodiment uses an FDD carrier, which is a conventional carrier type, in a wide area, and uses a TDD carrier, which is an additional carrier type, in a local area, so that it is possible to realize highly efficient communication while using conventional systems effectively.

The present invention is by no means limited to the above embodiment and can be implemented in various modifications. For example, without departing from the scope of the present invention, it is possible to adequately change the number of carriers, the bandwidth of carriers, the signaling method, the type of the additional carrier type, the number of processing sections, and the order of processing steps in the above description, and implement the present invention. Besides, the present invention can be implemented with various changes, without departing from the scope of the present invention.

The disclosure of Japanese Patent Application No. 2012-087673, filed on Apr. 6, 2012, including the specification, drawings and abstract, is incorporated herein by reference in its entirety.

The invention claimed is:

1. A user equipment comprising:
   a transmitting/receiving circuit that performs transmission/reception of a signal using carrier aggregation where a first carrier in frequency-division duplexing (FDD) and a second carrier in time-division duplexing (TDD) are aggregated; and
   a processor copied to a memory, the processor having a control section that controls the transmitting/receiving circuit to dynamically switch between uplink and downlink in the second carrier,
   wherein the control section controls the transmitting/receiving circuit to transmit uplink control information in either the first carrier or the second carrier.

2. The user equipment according to claim 1, wherein the control section, on the basis of a downlink control signal which is received by the transmitting/receiving circuit, controls the transmitting/receiving circuit to dynamically switch between the uplink and the downlink in the second carrier.

3. The user equipment according to claim 1, wherein the control section controls the transmitting/receiving circuit simultaneously to transmit an uplink signal in the second carrier and to make the uplink subject to non-transmission in the first carrier.

4. The user equipment according to claim 2, wherein the control section controls the transmitting/receiving circuit simultaneously to transmit an uplink signal in the second carrier and to make the uplink subject to non-transmission in the first carrier.

5. The user equipment according to claim 1, wherein the second carrier has no compatibility with legacy component carriers.

6. The user equipment according to claim 2, wherein the second carrier has no compatibility with legacy component carriers.

7. The user equipment according to claim 3, wherein the second carrier has no compatibility with a legacy component carrier.

8. The user equipment according to claim 7, wherein the first carrier has compatibility with the legacy component carrier and is used as a primary cell (PCell).

9. The user equipment according to claim 7, wherein the second carrier is used as a secondary cell (SCell).

10. The user equipment according to claim 1, wherein the control section controls the transmitting/receiving circuit to transmit uplink control information in the first carrier.

11. The user equipment according to claim 1, wherein the control section controls the transmitting/receiving circuit to transmit an uplink control channel in the second carrier.

12. A base station communicating with a user equipment that uses carrier aggregation where a first carrier in frequency-division duplexing (FDD) and a second carrier in time division duplexing (TDD) are aggregated, the base station comprising:
   a transmitting/receiving circuit that transmits a downlink signal in the second carrier; and
   a processor coupled to a memory, the processor having a control section that controls the transmitting/receiving circuit to dynamically switch between uplink and downlink in the second carrier,
   wherein the transmitting/receiving circuit receives uplink control information in the second carrier from the user equipment.

13. A base station communicating with a user equipment that uses carrier aggregation where a first carrier in frequency-division duplexing (FDD) and a second carrier in time-division duplexing (TDD) are aggregated, the base station comprising:
   a transmitting/receiving circuit that transmits a downlink signal in the first carrier; and
   a processor coupled to memory, the processor having a control section that controls the transmitting/receiving circuit to transmit downlink control information for dynamically switching between uplink and downlink in the second carrier,
   wherein the transmitting/receiving circuit receives uplink control information in the first carrier from the user equipment.

14. A radio communication method in a user equipment, comprising:
   receiving downlink signals using carrier aggregation where a first carrier in frequency-division duplexing (FDD) and a second carrier in time-division duplexing (TDD) are aggregated;
   dynamically switching between uplink and downlink in the second carrier; and
   transmitting uplink control information by using either the first ca her or the second carrier.

* * * * *